May 12, 1925. 1,537,061
J. G. BLUNT
LOCOMOTIVE DRIVING BOX
Filed Aug. 11, 1923 3 Sheets-Sheet 1
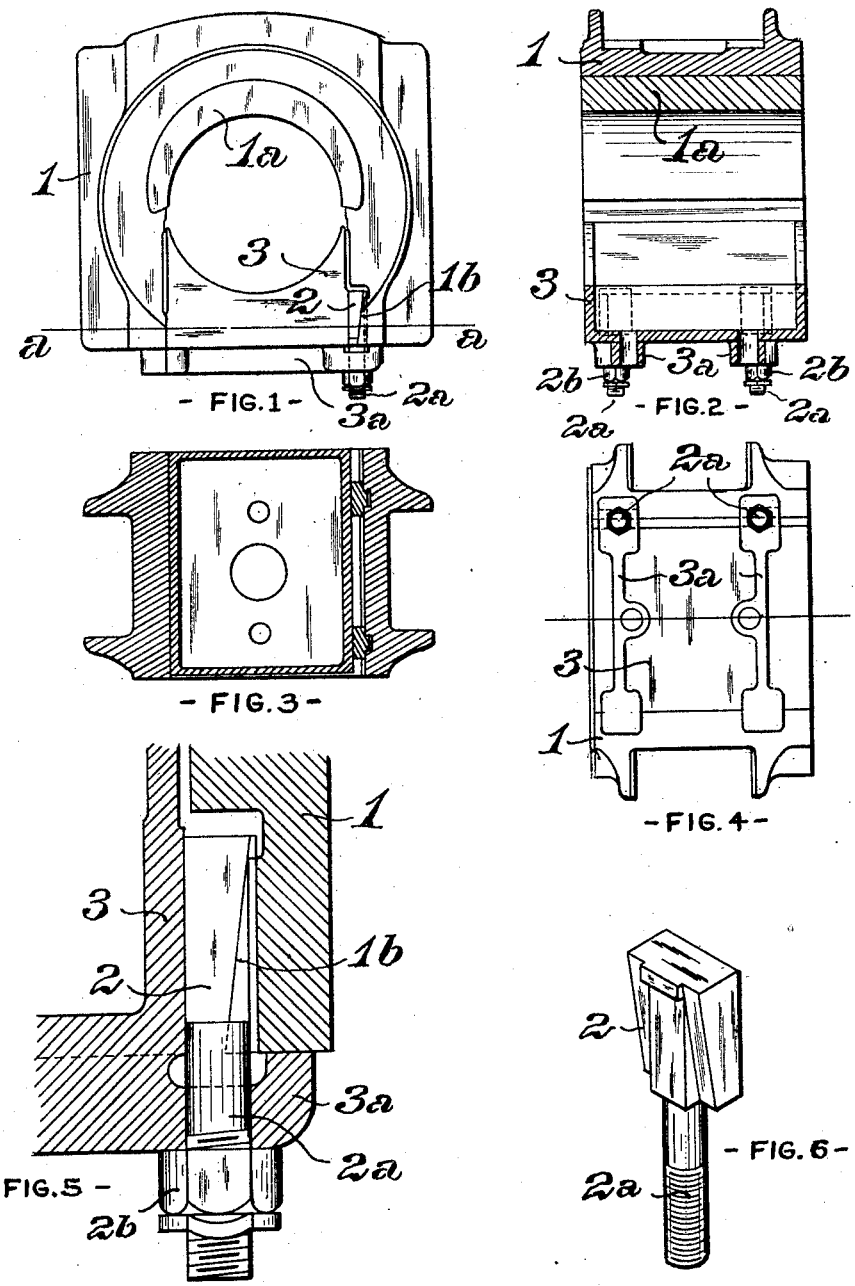

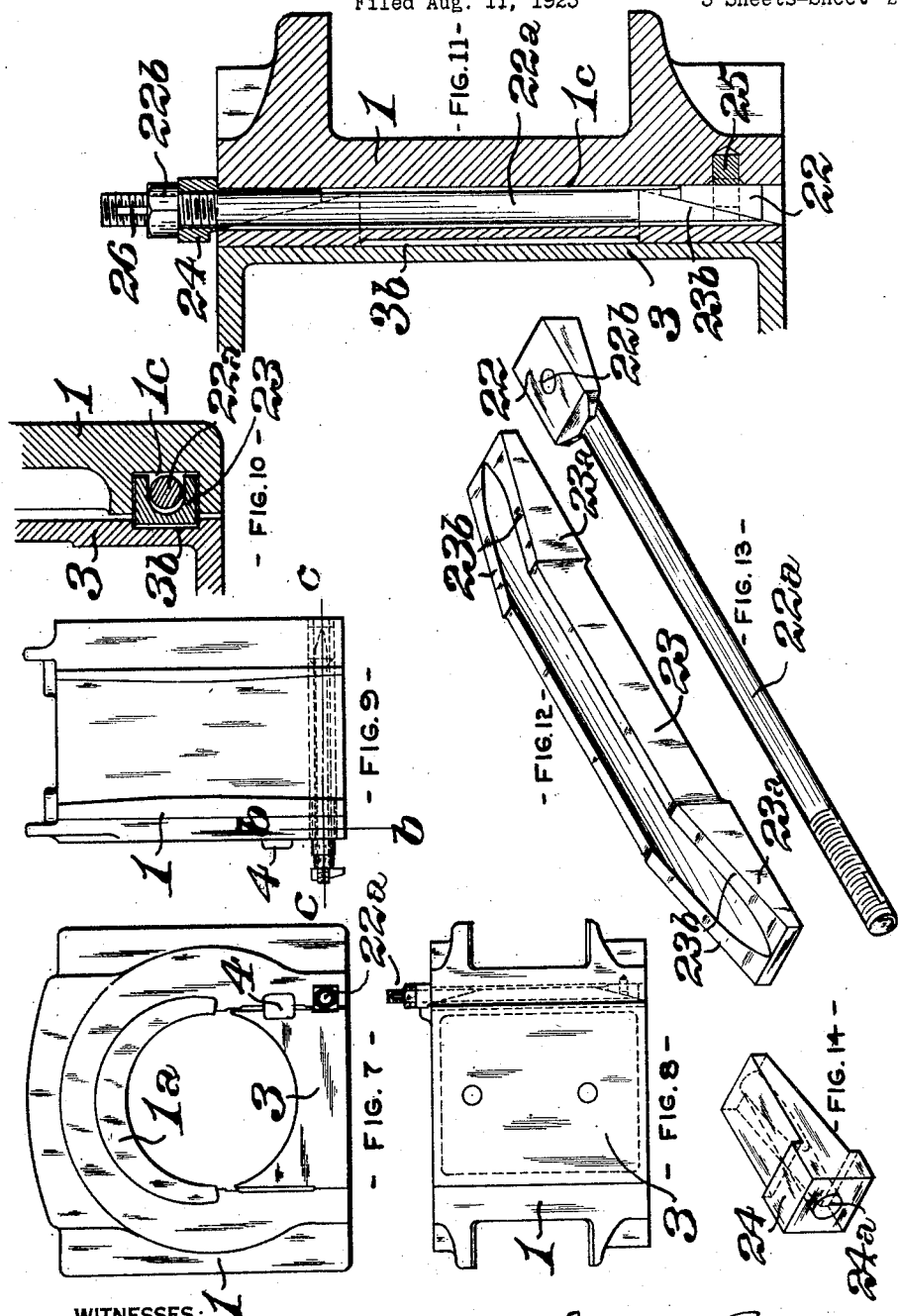

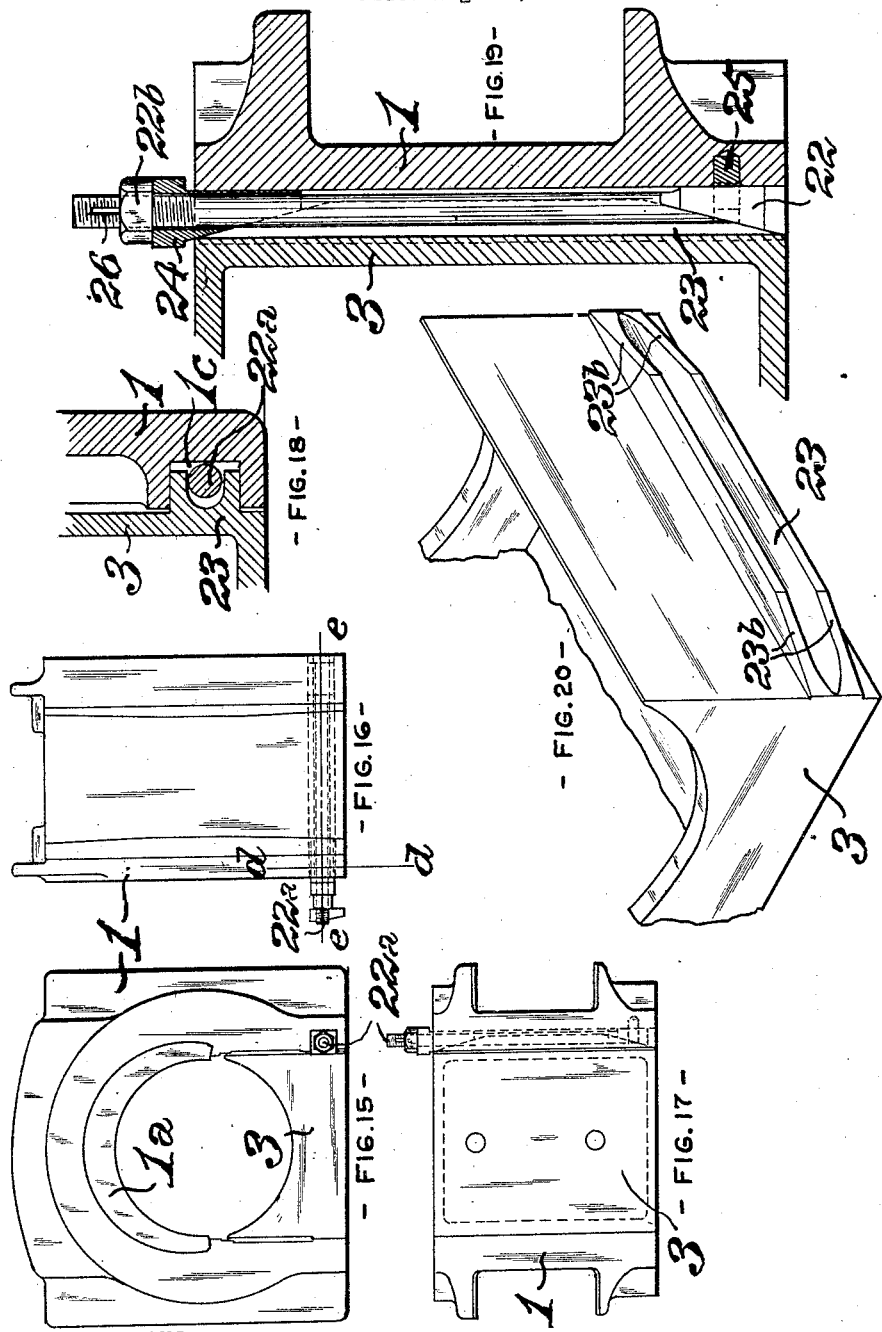

Patented May 12, 1925.

1,537,061

UNITED STATES PATENT OFFICE.

JAMES G. BLUNT, OF SCHENECTADY, NEW YORK.

LOCOMOTIVE DRIVING BOX.

Application filed August 11, 1923. Serial No. 656,957.

*To all whom it may concern:*

Be it known that I, JAMES G. BLUNT, of Schenectady, in the county of Schenectady and State of New York, have invented a certain new and useful Improvement in Locomotive Driving Boxes, of which improvement the following is a specification.

My invention more particularly relates to the application of lubricant cellars to locomotive driving boxes, and its object is to provide means, readily adaptable in connection with driving boxes of standard construction, whereby the cellar, in addition to performing its ordinary functions as a container of lubricant, will be caused to act as an expander for the bottom of the driving box, and thereby to counteract the ordinary tendency of driving boxes to close in the sides, and cramp the journal.

The improvement claimed is hereinafter fully set forth.

It is a well recognized fact that, in the practical service of locomotives, the sides of driving boxes close in, or towards each other, by reason of the combined effect of the load carried by the superstructure and the heat of the friction of the journal bearing. It is consequently of substantial advantage that the cellar which contains the journal lubricant, shall be readily insertible and removable, and that it may be readily adjustable, in correspondence with the tendency to inward movement of the sides of the journal box, and, at the same time, to prevent the closing in thereof. My invention is designed to attain this result, without involving structural complication or expense.

In the accompanying drawings: Figure 1 is a front view, in elevation, of a locomotive driving box embodying my invention; Fig. 2, a vertical longitudinal central section through the same; Fig. 3, a horizontal section, on the line $a\ a$ of Fig. 1; Fig. 4, a bottom plan view; Fig. 5, a partial vertical section, on an enlarged scale, through the bottom portion of one side of the driving box; Fig. 6, a view, in perspective, of an adjusting wedge; Fig. 7, a rear view, in elevation, of a driving box, showing a structural modification; Fig. 8, a bottom plan view of the same; Fig. 9, a side view, in elevation; Fig. 10, a partial vertical section, on an enlarged scale, on the line $b\ b$ of Fig. 9; Fig. 11, a partial horizontal section, on a similar scale, on the line $c\ c$ of Fig. 9; Fig. 12, a view in perspective, of a double stationary wedge; Fig. 13, a similar view of an adjusting bolt; Fig. 14, a similar view of a short adjusting wedge and bolt guide; Fig. 15, a rear view, in elevation, of a driving box, showing another structural modification; Fig. 16, a side view, in elevation, of the same; Fig. 17, an inverted plan view; Fig. 18, a partial horizontal section, on an enlarged scale, on the line $d\ d$ of Fig. 16; Fig. 19, a partial horizontal section, on a similar scale, on the line $e\ e$ of Fig. 16; and, Fig. 20, a partial view, in perspective, of a lubricant cellar.

In the practice of my invention, referring descriptively to the specific embodiment thereof which is herein exemplified, and first to Figs. 1 to 6 inclusive, the driving box, 1, is fitted with a crown brass, $1^a$, in the usual manner, and inwardly and downwardly inclined faces, $1^b$, for the contact of adjusting wedges, hereinafter described, are machined in one of its inner sides, adjacent to the bottom thereof.

A lubricant cellar, 3, is fitted between the downwardly extending side members of the driving box, in the ordinary manner, said cellar having transversely extending stiffening ribs, $3^a$, on its bottom, each of which is perforated, adjacent to one of its ends for the passage of an adjusting bolt $2^a$, which is formed on or otherwise fixed to the lower end of an upwardly inclined or tapering adjusting wedge, 2. Said wedges are fitted between the inclined faces, $1^b$, of the driving box, and the adjoining side of the lubricant cellar, 3, and are drawn to, and maintained in, a tight bearing thereon, by nuts, $2^b$, which engage the adjusting bolts, $2^a$, and bear on the outer sides of the ribs, $3^a$, of the lubricant cellar, through which ribs, the bolts, $2^a$, pass freely, as most clearly shown in Fig. 5.

It will be seen that by the action of the interposed adjusting wedges on the adjacent side member of the driving box and on the lubricant cellar, as maintained in bearing thereon, to compensate wear, by the adjustment of the nuts of the wedge adjusting bolts, the lubricant cellar is caused to perform the additional function of preventing inward movement of the side members of the driving box and in connection with the adjusting wedges, acts as an expander in providing an abutment for said wedges, with the result of effectually preventing cramping of the journal.

The structural modification shown in Figs. 7 to 14 inclusive, accords, operatively, with the construction above described, and differs, structurally, therefrom, in the location of the adjusting wedges, relatively to the driving box and lubricant cellar, said wedges, in this case, extending horizontally, instead of vertically as in the former instance, and also in the application of additional wedging surfaces. As most clearly shown in Fig. 11, a single adjusting bolt, 22ª, extends horizontally through the driving box, 1, adjacent to the bottom of one of its side members, being fitted between a groove, 1ᶜ, in the driving box, and a parallel groove, 3ᵇ, in the lubricant cellar, 3. The bolt, 22ª, is formed on, or fixed to, an adjusting wedge, 22, the flat side of which abuts against the bottom of the driving box groove, 1ᶜ, and the inclined side, against correspondingly inclined faces, 23ᵇ, at one end of a double stationary wedge, 23, fitted between the driving box and the cellar, in the grooves, 1ᶜ and 3ᵇ.

As shown in Figs. 10 to 12, the stationary wedge is double, or of channel section, so as to provide a space for the passage of the adjusting bolt, 22ª, and raised faces, 23ᵇ, are formed upon it, adjacent to its ends, to bear against the sides of the driving box groove, 1ᶜ, and the bottom of the cellar groove 3ᵇ. Inclined bearing faces, 23ᵇ, are formed on the top of the wedge, 23, adjoining its ends, said faces being downwardly inclined at each end thereof, in correspondence with the inclination of the wedge, 22, and of a short adjusting wedge and bolt guide, 24, fitting in the driving box groove, 1ᶜ, at the end further from the wedge, 22, and having a longitudinal perforation, 24ª, through which the bolt, 22ª, passes. The wedge, 24, seats on the adjacent end face of the driving box, and a nut, 22ᵇ, which engages the adjusting bolt, 22ª, bears on its outer end. The nut, 22ᵇ, is held in position by a split pin, 26. Longitudinal movement of the adjusting bolt, 22ª, is prevented by a stop, 25, fixed in the driving box, and engaging a perforation, 22ᵇ, in the wedge, 22. A lug, 4, on the lubricant cellar, engages the driving box, to maintain proper clearance between the cellar and the wheel hub face.

In assembling the appliance, the adjusting bolt, 22ª, is slid into the space between the grooves, 1ᶜ and 3ᵇ, until the stop, 25, can be engaged with the perforation, 22ᵇ, of the wedge, 22. The stationary wedge, 23, is then inserted, and the wedge, 24, is slipped over the projecting end of the bolt, 22, and slid forwardly on the bolt, as far as it can be moved. The nut, 22ᵇ, is then tightened against the wedge until the split key, 26, can be inserted.

It will be seen that the tension applied to the bolt, 22ª, by the pressure of the nut, 22ᵇ, on the wedge, 24, acts on the inclined wedging surfaces of the wedge, 23, and through the action of said inclined surfaces, exerts pressure through the lubricant cellar, to the opposite side member of the driving box, forming, in effect, a strut, which resists closing in tendency of the side members thereof. The construction also provides a support for the cellar, preventing it from being dropped downward out of place, as the cellar rests on the stationary wedge, 23, fitting in the grooves, 1ᶜ and 3ᵇ.

The structural modification shown in Figs. 15 to 20 inclusive, accords, in all substantial particulars, with that last above described, differing therefrom in the particular that the stationary wedge, 23, is made integral with the lubricant cellar, 3, instead of separate therefrom, as in the former instance. In the construction of Figs. 15 to 20 inclusive, the groove, 3ᵇ, of the lubricant cellar, becomes unnecessary, and is, therefore, omitted.

The form of my invention in which a horizontal wedge bolt is applied, is advantageous in that the appliance is located entirely above the bottoms of the driving box and lubricant cellar, there consequently being no downwardly projecting lugs that could hook over the frame pedestal, when sliding the lubricant cellar out of place. The construction is further of advantage by reason of the fact that the horizontal bolt having its nut nearer the longitudinal central plane of the locomotive, is more easily removable than vertical bolts. Moreover, this form of the appliance is more readily applicable to driving boxes already in service, as no alterations thereof are required, other than the formation of the grooves in the driving box and lubricant cellar, for the installation of the appliance.

I claim as my invention and desire to secure by Letters Patent:

1. The combination of a locomotive driving box, having a longitudinal groove, adjacent to its bottom; a crown brass in said driving box; a lubricant cellar, fitted in the driving box, below the crown brass, and having a longitudinal groove, facing the groove of the driving box; wedging mechanism, located in said grooves; and means for adjusting said wedging mechanism.

2. The combination with a locomotive driving box having a longitudinal groove in one of its downwardly extending side members, of a lubricant cellar fitted between said side members and having a corresponding groove in one of its sides, the groove in the box having fixed oppositely inclined surfaces near its ends, a bolt passing through said grooves and having an inclined head bearing on one of said inclined surfaces, a wedge surrounding the free end of said bolt and engaging the other of said inclined surfaces and the adjacent end surface of the box, and a nut threaded on said bolt and engaging said wedge.

3. The combination of a locomotive driving box, having a longitudinal groove, adjacent to its bottom; a crown brass in said driving box; a lubricant cellar, fitted in the driving box, below the crown brass; a stationary wedge, fitting in the groove of the driving box, and having, respectively, oppositely inclined faces on its ends; an adjusting wedge, abutting on the inclined faces at one end of the stationary wedge; an adjusting bolt, fixed at one end to the adjusting wedge; a third wedge, surrounding the other end of said bolt and abutting on the inclined faces at the opposite end of the stationary wedge and on the driving box; and a nut, engaging the adjusting bolt and bearing on said third wedge.

JAMES G. BLUNT.

Witnesses:
CHAS. W. BELL,
A. S. VANDERBILT.